Figure 1:
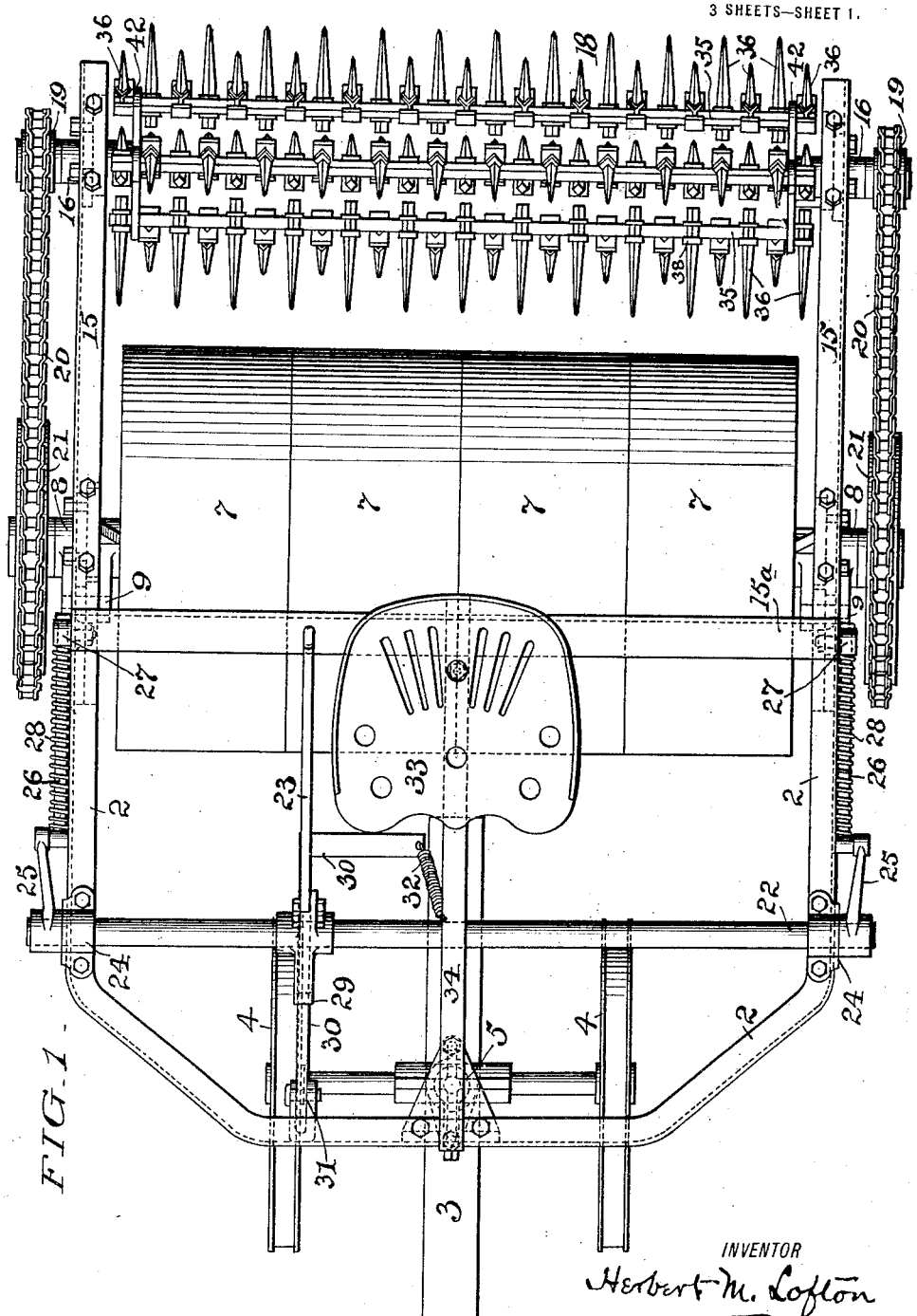

H. M. LOFTON.
COMBINATION ROLLER AND ROTARY HARROW.
APPLICATION FILED FEB. 27, 1920. RENEWED JAN. 27, 1922.

1,408,615.

Patented Mar. 7, 1922.
3 SHEETS—SHEET 1.

INVENTOR
Herbert M. Lofton
BY
ATTORNEY

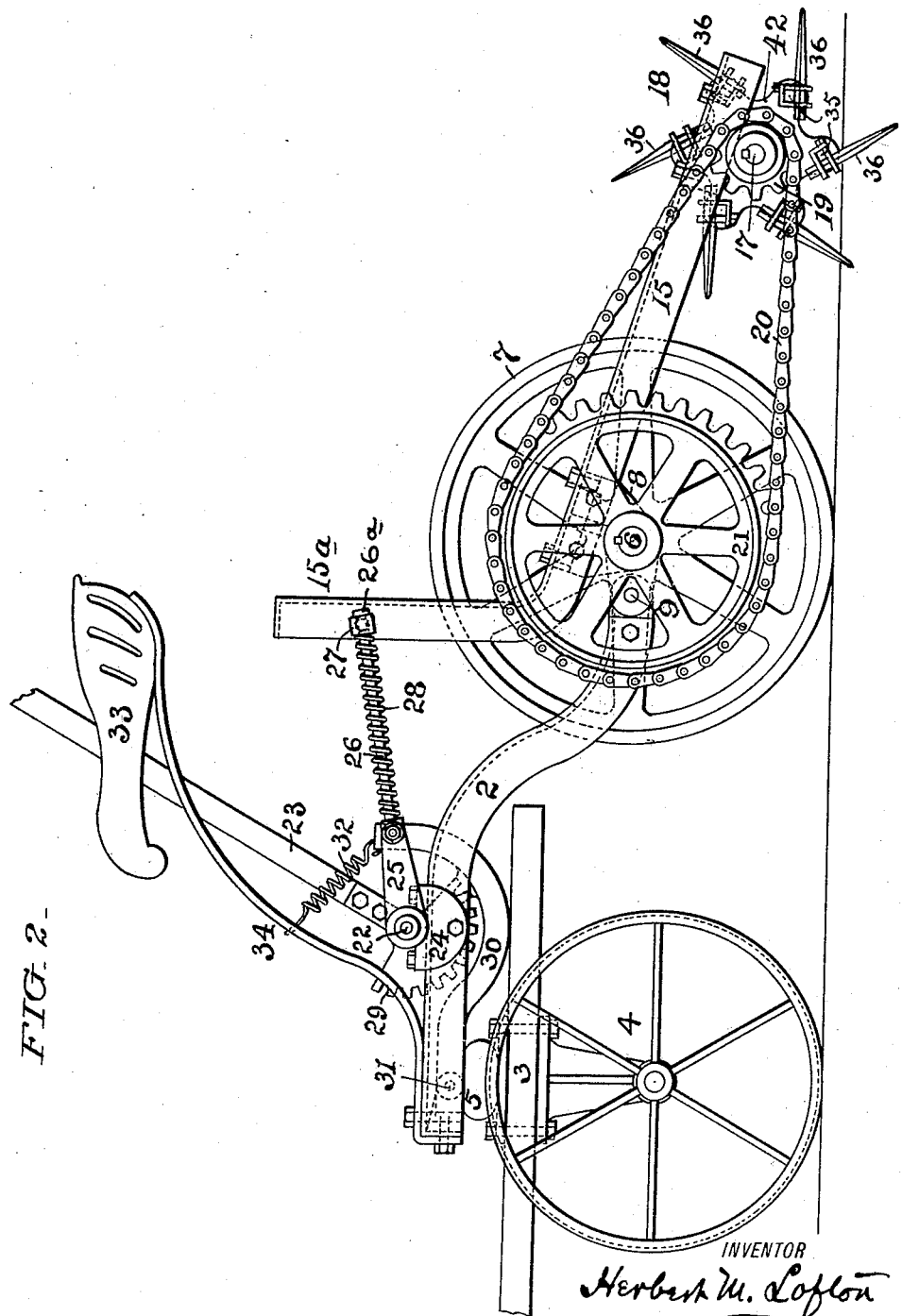

H. M. LOFTON.
COMBINATION ROLLER AND ROTARY HARROW.
APPLICATION FILED FEB. 27, 1920. RENEWED JAN. 27, 1922.
1,408,615.
Patented Mar. 7, 1922.
3 SHEETS—SHEET 3.
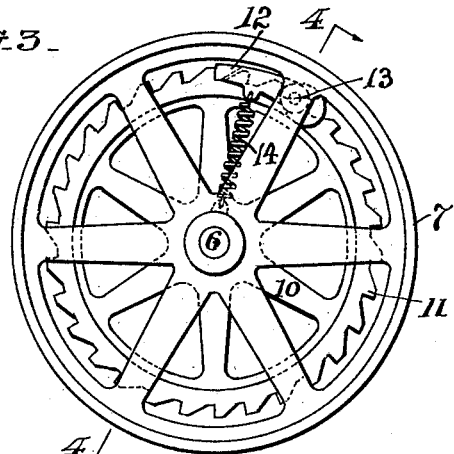
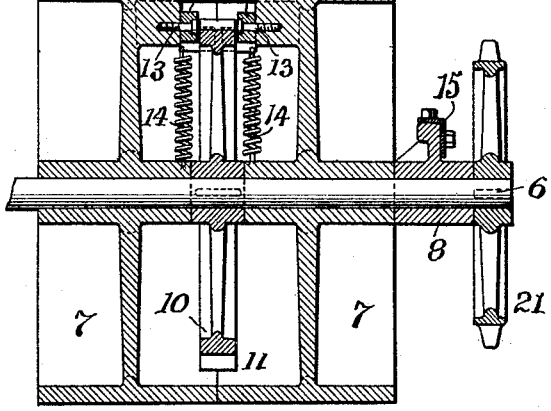
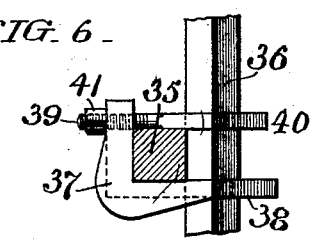
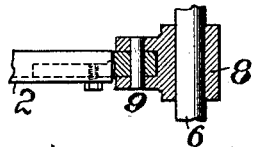
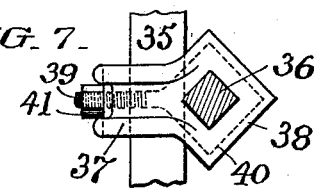
INVENTOR
Herbert M. Lofton
BY
ATTORNEY

UNITED STATES PATENT OFFICE.

HERBERT M. LOFTON, OF CHATTANOOGA, TENNESSEE.

COMBINATION ROLLER AND ROTARY HARROW.

1,408,615. Specification of Letters Patent. Patented Mar. 7, 1922.

Application filed February 27, 1920, Serial No. 361,820. Renewed January 27, 1922. Serial No. 532,263.

*To all whom it may concern:*

Be it known that I, HERBERT M. LOFTON, a citizen of the United States, and resident of Chattanooga, county of Hamilton, and State of Tennessee, have invented an Improvement in Combination Rollers and Rotary Harrows, of which the following is a specification.

The object of my invention is to provide a combined roller and rotary harrow or mulcher adapted to be pulled or propelled over land which has been previously plowed, for the purpose of breaking up the clods and at the same time creating a firm and uniform seed bed; the bed so formed being subjected to treatment of a rotary harrow which follows the rollers, and so acting upon the rolled earth that it creates a soft mulch on top of the soil, the said mulch serving two purposes, namely, to put the surface of the soil in proper condition for receiving the seed to be planted, and providing the character of soft surface mulch which will retain the moisture in the ground where it is needed.

My object, furthermore, is to provide in one machine means for breaking down and leveling the clods and immediately thereafter transforming the upper surface of the soil, so leveled, into a mulch of the desired character. In the means for accomplishing this purpose, provision is made whereby the depth of the mulch is substantially uniform, so that the character of the soil, so far as its mechanical manipulation is concerned, is substantially homogenous.

With the above and other objects in view, the nature of which will be more fully understood from the description hereinafter, the invention consists in the novel construction of combined roller and rotary harrow, as hereinafter more fully described and defined in the claims.

Referring to the drawings: Fig. 1 is a plan view of my combined roller and rotary harrow or mulcher; Fig. 2 is a side elevation of the same; Fig. 3 is an end elevation of the roller elements removed from the framing and rest of the machine; Fig. 4 is a sectional view taken on line 4—4 of Fig. 3, with the driving wheel and part of the framing in section; Fig. 5 is a sectional plan view showing the roller shaft bearing and its hinged connection to the main frame; Figs. 6 and 7 are sectional views illustrating the manner of securing the harrow teeth in position; and Fig. 8 is a perspective view of the pawl employed in connection with the rollers.

The main frame is shown at 2 and in plan is substantially U-shaped. At its forward end, it is journaled on a king-bolt arrangement 5 upon a truck 3 having supporting wheels 4, said truck corresponding to the front wheels of any vehicle which may be pulled by a horse or constituting, if so desired, the rear portion of a motor vehicle or tractor. The rear ends of the frame 2 are hinged at 9 to bearings 8 in which is journaled the roller shaft 6. Upon the roller shaft are loosely journaled four rollers 7 and these may be considered as in pairs, as indicated in Fig. 4. Secured to the shaft 6 and arranged intermediate of each pair of the rollers 7, is a toothed wheel 10, the teeth 11 of which are preferably formed like ratchet teeth. Pawls 12 are pivoted at 13 to the respective rollers 7 and have their free ends engaging the teeth 11 of the wheel 10; these pawls being maintained in engagement under spring action by the coiled springs 14 connected at one end to the pawls and at the other end to the hubs of the rollers. From this construction, it will be manifest that when the rollers are pulled over the ground, the pawls thereof will engage the teeth of the wheel 10 and in that manner rotate the shaft 6 which is to be employed for imparting rotary motion to the harrow or mulcher.

By the arrangement of the rollers 7 in pairs and the locating of the pairs of rollers at opposite sides of the longitudinal center of the machine, it will be manifest that these rollers, through their pawl and ratchet connections with the wheels 10, will compensate for any irregular travel or turning at the ends of the fields. This arrangement would act very much like the compensating gear of automobiles in which either wheel may rotate faster than the other wheel, according to the direction of turning. In the present case, it would be equivalent to having four wheels all adapted to compensate independently, and this is desirable because of the great width of the surface contact of the rollers with the ground. It is manifest that by employing a plurality of rollers in the width of the machine, the necessity of the surface slippage in turning corners will be materially less than what would be the case if only a single roller, or at most two rollers, were employed. I, therefore, consider it important that there shall be a plurality of rollers and preferably four such rollers, as shown. So far as the invention is concerned, however, the number of rollers may be varied.

The compensating means which I have employed is exceedingly simple and suitable for the machine of the character herein set out and while I prefer the same, it is to be understood that I do not restrict myself to this particular character of compensating gear, as I may employ any of the gears now known for accomplishing the same purpose.

An adjustable frame 15, made of angle iron bent in U shape at 15ª, is bolted to the bearings 8 on the roller shaft 6 and to which the main frame 2 is hinged. The frame 15 has its rear ends provided with bearings 16 in which the shaft 17 of the harrow 18 is journaled. The ends of the shaft 17 are provided with sprocket wheels 19, which are respectively driven by sprocket-chains 20, receiving their motion from the large sprocket wheels 21 respectively upon the ends of the roller shaft 6, before referred to. In this manner, the shafts 6 and 17 are connected so that the harrow is driven at a relatively high speed of rotation when the rollers are moved over the ground. I have thus employed sprocket wheels and chains because of their simplicity, economy and durability, but it is to be understood that any other mode of power transmission from the roller shaft 6 to harrow shaft 17 may be employed in lieu of that shown, if so desired.

The harrow or mulcher 18 may be constructed in any suitable manner, but I prefer to make it as shown and to be now described. Secured to the shaft 17 near each end and just inside of the bearings 16, I provide heads 42; and arranged between said heads are a series of parallel bars 35, spaced apart in a circle and having their ends extended through the heads. These bars 35 are polygonal in cross section, preferably square, so that they will not rotate in the heads 42, and further, so that they will hold the harrow teeth 36 in such manner that they will be prevented from rotation upon the bars. These harrow teeth 36, are pointed at their outer ends and formed preferably of bar metal of square or other polygonal cross section and are adjustably and detachably clamped upon the bars 35 by clamps comprising the parts more fully shown in Figs. 6 and 7. These clamps consist of an angle bar 37 fitting two sides of the bar 35 and having at one end a head 38 provided with a square hole through which the harrow tooth 36 extends.

The other arm of the bar 37 is provided with a hole through which the threaded shank 39 extends, said shank having at its end a head 40 also having a square hole through which the harrow tooth extends. When the parts are assembled, as shown in Figs. 6 and 7, a nut 41 on shank 39 is screwed up and this action causes the harrow tooth to be tightly clamped to the bar 35. This construction permits of adjustment of the harrow teeth in spaced relation along the bars 35 and also to have their points adjusted to penetrate to a predetermined depth into the soil as well as to compensate for wear. The bars 35 are held against longitudinal movement in the heads 42 by reason of the fact that a harrow tooth is clamped to the bar close up to each side of the head, as shown. By reference to Figs. 1 and 2, it will be seen that the teeth 36 on the adjacent bars are in staggered relation to more thoroughly mulch or pulverize the soil; and further, the teeth are more or less tangentially positioned so that when the harrow rotates, the teeth stab the ground point on and thereby enter easily and cut through the soil with more or less side motion in the most effective manner. The front and rear angular edges of the teeth are in alinement with the plane of rotation and are, therefore, well adapted to cut through the ground with some lateral displacement of the earth. As the speed of the harrow shaft is approximately three times the speed of the roller shaft, it is manifest that as the machine advances, the rapidity of action by the harrow will insure the desired mulching of the soil which has been broken down and flattened by the rollers.

A rock shaft 22, journaled in bearings 24 on the main frame 2, is provided at each end with a crank 25, to which a rod 26 is hinged. The other end of the rod 26 extends through the head of a bolt 27 loosely pivoted to the upright portion 15ª of the harrow frame 15 and has an enlargement or head 26ª which limits the maximum extension of the rod. A coiled spring 28 surrounds the rod 26 and acts to normally keep the parts 26ª and 27 in contact, as shown. It will be understood that with the parts in position as shown in Fig. 2, the frame 15 will be so supported that the harrow teeth will have a definite maximum penetration into the soil, but if from any cause the harrow was forced upward, as in striking upon a stone, the frame 15 will rock about shaft 6 as a fulcrum and compress the springs 28 to relieve the strain. While a single crank 25, rod 26, and spring 28 might be sufficient for the purpose required of these elements, I prefer to duplicate these parts at opposite sides of the machine as shown. The rock shaft 22 has secured to it an operating hand lever 23 arranged to come within reachable distance of the seat 33 for the driver, said seat being supported upon the upper end of the spring support 34 which at its lower end is bolted to the forward portion of the main frame 2 (Fig. 2). The lever 23 is provided with the notched segment 29 which is adapted to be engaged by the detent lever 30 pivoted to the main frame 2 at 31, and locked in position of adjustment. The free end of the detent lever 30 is extended laterally within easy reach of the foot and is pulled upwardly and laterally into engagement with the notched segment by a spring 32. As shown, the parts in Fig. 2 are in operative relation for mulching, and should it be necessary to raise the harrow from the ground, as during transportation or for avoiding an obstruction, the detent lever 30 is moved by the foot out of engagement with the notched segment 29 and thereby releases the lever 23, which may then be thrust forward with the result of rotating the shaft 22 and crank arms 25. This action pulls upon part 15ª of frame 2, raising its rear end and with it the harrow 18. The parts may then be locked in the adjusted position by releasing the detent lever 30.

In the general construction of the machine, I have simplified the details so as to permit easy assemblage and also replacements, in case of wear or breakage. The main frame 2 and pivoted frames 15, 15ª, are both made of angle iron and hinged together, the hinge structure also being journaled upon the ends of the roller shaft 6, the whole forming a closely connected structure with few parts and all acting to relatively position and stiffen the elemental parts.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In an agricultural machine, the combination of a roller, a main frame of U-shape form having its two rearwardly extending side portions hinged adjacent to the axis of the roller and supported thereby, a pivoted truck at the forward part of the main frame and having a forwardly extending shaft portion, a second U shaped frame having its sides extended rearwardly of the roller and hinged at their forward portions adjacent to the axis of said roller and also providing an upwardly and transversely extending portion, a harrow journalled in the rear and free ends of the arms of the pivoted frame, and power transmitting means between the roller and the harrow, whereby the latter is rotated from the former.

2. The invention according to claim 1, further characterized by having means for adjusting the hinged frame whereby the harrow may be made to mulch the soil to a predetermined depth.

3. The invention according to claim 1, wherein the hinged frame is spring pressed to move the harrow toward the ground with a yielding pressure, and hand controlled means are provided on the main frame for lifting the frame and harrow upward independently of the action of the spring whereby it may be sustained clear of the ground.

4. The invention according to claim 1, wherein the hinged frame is spring actuated to yieldingly press the harrow into the ground, and adjusting means are provided for putting the spring into and out of action respectively when the harrow is in operation in the ground and when it is lifted out of the ground.

5. An agricultural machine, comprising a roller formed of a plurality of sections end to end on the same shaft and independently rotatable, and said roller sections coupled with the shaft through compensating means whereby one or more of the roller sections may impart rotation to the shaft.

6. The invention according to claim 5, wherein the compensating means comprises a ratchet wheel secured to the shaft, and separate spring actuated pawls respectively hinged to the roller sections and engaging the ratchet wheel.

7. The invention according to claim 5, wherein there are four roller sections arranged end to end loosely upon the shaft, and said roller sections arranged in pair respectively to each side of a longitudinal central line through the machine and said pairs of roller sections each provided with compensating gear devices for coupling the sections thereof with the shaft, whereby any portion or all of the roller sections may positively rotate the shaft.

8. An agricultural machine comprising a main frame having a shaft and a roller thereon for crushing plowed ground, combined with a rotary harrow, a hinged frame extending to the rear of the roller and in which the harrow is journaled, power transmitting means operated by the roller shaft for rotating the harrow, wherein the hinged frame is provided with bearings journaled upon the roller shaft and main frame is supported upon independent truck devices in advance of the roller and in which further the rear end of the main frame is hinged to the bearings, and said frames further connected by adjustable means for adjusting the hinged frame relatively to the main frame and to and from the ground at its rear or harrow supporting end.

9. In an agricultural machine, the combination of a roller for crushing down plowed soil, a main frame for guiding and propelling the roller, and extended forward and supported upon pivoted truck devices, a pivoted frame hinged to the main frame and roller, a rotary harrow journalled in the pivoted frame and arranged immediately to the rear of the roller, and power transmitting means for rotating the harrow from the roller and at a higher speed of revolution than the roller.

10. The invention according to claim 5, further provided with a harrow, a frame in which the harrow is journaled also hinged to the roller shaft, and sprocket and chain driving means between the roller shaft and harrow.

11. The invention according to claim 9, wherein the rotary harrow has a driven shaft having heads therein and a plurality of harrow teeth secured to the bars along their length by means of adjustable clamping means.

12. In an agricultural machine, the combination of a roller, a transverse shaft upon which the roller is loosely journaled, pawl and ratchet transmission devices between the roller and the shaft, a pivoted frame journaled upon the shaft at each end of the roller, a rotary harrow journaled to the pivoted frame at the rear of the roller, power transmission devices comprising chain and sprocket wheels for driving the harrow from the roller shaft, a main frame hinged at its rear to the pivoted frame and supported at its forward end upon wheels, a pivoted lever on the main frame having a crank, a link between the crank and the pivoted frame whereby the oscillation of the pivoted lever may oscillate the pivoted frame to raise and lower the harrow, and locking means for locking the lever in its adjusted position.

13. In an agricultural machine, the combination of a roller, a transverse shaft upon which the roller is loosely journaled, pawl and ratchet transmission devices between the roller and the shaft, a pivoted frame journaled upon the shaft at each end of the roller, a rotary harrow journaled to the pivoted frame at the rear of the roller, power transmission devices comprising chain and sprocket wheels for driving the harrow from the roller shaft, a main frame hinged at its rear to the pivoted frame and supported at its forward end upon wheels, a pivoted lever on the main frame having a crank, a link between the crank and the pivoted frame whereby the oscillation of the pivoted lever may oscillate the pivoted frame to raise and lower the harrow, spring devices interposed between the crank and the pivoted frame whereby the downward movement of the harrow may be definitely limited and its upward movement is yieldingly permitted against the action of the spring, and locking means for locking the lever in its adjusted position.

In testimony of which invention, I hereunto set my hand.

HERBERT M. LOFTON.